United States Patent Office 3,419,564
Patented Dec. 31, 1968

3,419,564
PRODUCTION OF BIS(1-ARYLUREIDO)-BENZENE-p- OR m-DICARBOXYLIC ACID DIALKYL ESTERS
Gustav Bock, Neustadt an der Weinstrasse, Germany, assignor to Badische Anilin- & Soda-Fabrik Aktiengesellschaft, Ludwigshafen (Rhine), Germany
No Drawing. Filed Mar. 30, 1964, Ser. No. 355,924
Claims priority, application Germany, Apr. 5, 1963, B 71,420
6 Claims. (Cl. 260—294.3)

ABSTRACT OF THE DISCLOSURE

Production of bis-(1-arylureido)-benzene-p- or m-dicarboxylic acid dialkyl esters by rearrangement of bis-isourea ethers of dihydroxy-benzene-p- or m-dicarboxylic acid dialkyl esters at elevated temperature, and the new bis-(1-arylureido)-benzene-p- or m-dicarboxylic acid dialkyl esters having fungicidal activity and useful as intermediates for the production of quinacridone dyes.

---

This invention relates to a process for the production of N,N'-bis-carbamoyldiarylaminodialkyl esters of benzenedicarboxylic acids (bis-1-arylureido-benzene-p- or m-dicarboxylic acid dialkyl esters) and these substances themselves.

The object of this invention is to provide a process by which valuable N,N'-bis-carbamoyldiarylaminodialkyl esters of benzene dicarboxylic acids (bis-1-arylureido-benzene-p- or m-dicarboxylic acid dialkyl esters) are obtained by thermal rearrangement of bis-isourea ethers of dihydroxydialkyl esters of benzenedicarboxylic acids (dihydroxy-benzene-p- or m-dicarboxylic acid dialkyl ester) in which the hydroxy groups are in ortho position to the ester groups. A further object of the invention is to provide the substances themselves.

I have found that N,N'-bis-carbamoyldiarylaminodialkyl esters of benzenedicarboxylic acids (bis-1-arylureido-benzene-p- or m-dicarboxylic acid dialkyl esters) whose arylamino groups are in ortho-position to the carbalkoxy groups and in which the arylamino groups may bear as substituents a nitro group, one or more alkyl or alkoxy groups or one or more halogen atoms, and in which the carbamoyl radical may bear as substituents one of more alkyl groups (which with the nitrogen of the carbamoyl radical may be members of a piperidine, pyrrolidine or hexamethyleneimine ring) and/or one or more aryl radicals, are obtained by heating the bis-isourea ether of the corresponding dihydroxydialkyl ester of the benzenedicarboxylic acid (dihydroxy-benzene-p- or m-dicarboxylic acid dialkyl ester) to a temperature of from 70° to 200° C., preferably from 100° to 170° C.

The hitherto unknown bis-isourea ethers used as initial materials may be prepared very simply for example by reaction of aryliminocarbamyl halides, preferably the chlorides, with dihydroxydialkyl esters of iso- or terephthalic acid whose hydroxyl groups are in ortho-position to the carbalkoxy groups. They may be obtained by reaction of dialkali metal phenolates of dihydroxydialkyl esters of benzenedicarboxylic acids with for example chloroformylamidines. In the process according to this invention it is not necessary to isolate the initial materials from the mixture in which they have been prepared. The reaction mixture may serve direct as the initial materials for the process.

The reaction for example of bis-isourea ethers of isophthalic acid esters (dihydroxy-benzene-p- or m-dicarboxylic acid dialkyl ester) having the general Formula I to the corresponding ureas having the general Formula II may be represented by the following equation:

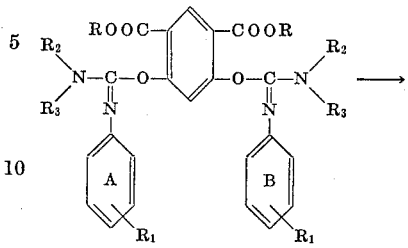

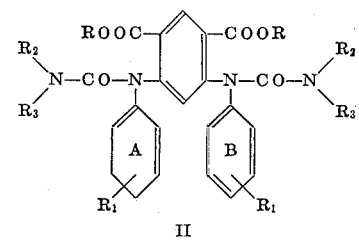

In these formulae, R denotes a lower alkyl radical having one to four carbon atoms, for example a methyl group or ethyl group, $R_1$ denotes hydrogen atoms, one or two nitro groups, one or two halogen atoms, such as chlorine or bromine, one or two alkyl groups each having one to four carbon atoms, or one or two alkoxy groups each having one to four carbon atoms and the rings A and B may be phenyl or naphthyl radicals or also components of an aromatic-heterocyclic system, for example a 9-methylcarbazyl radical; $R_2$ and $R_3$ denote alkyl radicals having one to four carbon atoms, such as methyl, ethyl, butyl or phenyl or naphthyl radicals; the radicals $R_2$ and $R_3$ may also be, together with the nitrogen atom, members of a piperidine, pyrrolidine or hexamethyleneimine ring. For example the radical

may denote the piperidino, hexamethylenimino or pyrrolidino radical. The meanings of the radicals R, $R_1$, $R_2$, $R_3$, A and B in the Formulae I and II hold good for bis-isourea ethers or N,N'-bis-carbamoyldiarylaminodialkyl esters (bis-[1-arylureido]-dialkyl ester) of isophthalic acid and also for the corresponding compounds of terephthalic acid.

For rearrangement into the new N,N'-dicarbamoyldiarylaminodialkyl esters of benzenedicarboxylic acids (bis-1-arylureido-benzene-p- or m-dicarboxylic acid dialkyl esters), the bis-isourea ethers are heated to the necessary temperature either in a melt or in solvents, for example hydrocarbons having six to twelve carbon atoms, such as benzene, heptane, xylenes, ethylbenzene, halogenated or nitrated hydrocarbons, such as chlorobenzene, nitrobenzene, o-dichlorobenzene, N,N-dialkylamides of lower fatty acids, N-alkylactams, such as dimethylformamide or N-methylpyrrolidone-2 or ethers, for example diphenyl ether. The level of the rearrangement temperature required is dependent on the constitution of the compound to be rearranged. Thus for example the bis-N-phenyl-N,N'-dimethylisourea ether of 4,6-dihydroxyisophthalic acid dimethyl ester undergoes rearrangement very rapidly at only 100° C. whereas the equivalent derivative of 2,5- dihydroxyterephthalic acid dimethyl ester is not spontaneously rearrangement into the urea until about 150° C. Rearrangement of the bis-isourea ethers takes place at substantially lower temperatures than those at which spontaneous rearrangement occurs but the reaction period is longer. As a rule rearrangement is carried out at a temperature of from 70° to 200° C., particularly from 100° to 170° C.

Since the N,N'-dicarbamoyldiarylaminodialkyl esters (bis-[1-arylureido]-dialkyl ester) are usually difficult to crystallize, it is often recommendable to carry out the rearrangement in solvents, for example in about twice their weight of o-dichlorobenzene, because they can be obtained more readily in crystalline form from their solutions. When the rearrangement products do not crystallize, the yield may be easily determined after removal of the solvent by saponifying the oily crude product for example with sulfuric acid to form the corresponding diarylaminobenzenedicarboxylic acid, because this reaction proceeds practically quantitatively.

The N,N'-dicarbamoyldiarylaminodialkyl esters of benzenedicarboxylic acids (bis-1-arylureido-benzene-p- or m-dicarboxylic acid dialkyl esters) have fungicidal activity and are important intermediates for the production of dyes. For example they may be converted by cyclization in the presence of acid catalysts into quinacridone dyes.

The invention is illustrated by the following examples. The parts and percentages specified in the examples are units of weight.

EXAMPLE 1

27 parts of disodium phenolate of 2,5-dihydroxyterephthalic acid dimethyl ester (prepared from dimethyl 2,5-dihydroxyterephthalate and sodium methylate solution) which has been washed free from methanol with acetone is suspended in 100 parts of acetone and at 50° C. a solution of 37 parts of N-phenyl-N',N'-dimethyl-2-chloroformylamidine (obtained from N-phenyl-N',N'-dimethylurea and phosgene) in 50 parts of acetone is added in such a way that the temperature is kept at 50° C. without further supply of heat. When all the chloroformylamidine has been added, the whole is cooled and the crystalline precipitate is suction filtered. It is washed with water to remove sodium chloride. 45 parts of the yellowish bis-N-phenyl-N',N'-dimethylisourea ether of dimethyl 2,5-dihydroxyterephthalate is obtained which has a melting point of 150° C. (not sharp).

Analysis.—Found: C, 64.7%; H, 6.1%; O, 19.0%; N, 10.4%. Calculated: C, 64.8%; H, 5.8%; O, 18.5%; N, 10.8%.

The corresponding diethyl ester having an indefinite melting point of 145° C. is obtained in the same way.

Other solvents free from hydroxyl groups, for example dimethylformamide, N-methylpyrrolidone-2, 1,4-dioxane, or hydrocarbons, as for example benzene or dichlorobenzene, may be used instead of acetone. The following bis-isourea ethers of dimethyl 2,5-dihydroxyterephthalate may be prepared in the same way:

(a) Bis-N-phenyl-N',N'-diethylisourea ether, pale yellow crystals, melting point 92° C.;

(b) Bis-N-phenyl-N',N'-di-n-butylisourea ether, pale yellow crystals, melting point 91° C.;

(c) Bis-N-phenyl-N',N'-diphenylisourea ether, pale yellow crystals, melting point 96° C.;

(d) Bis-N-4-chlorophenyl-N',N'-diethylisourea ether, colorless crystals, melting point 126° C.;

(e) Bis-N-4-methylphenyl - N',N' - di - n-butylisourea ether, pale yellow crystals, melting point 101° C.

50 parts of bis-N-phenyl-N',N'-dimethylisourea ether of dimethyl 2,5-dihydroxyterephthalate is gradually heated to 150° C. in about thirty minutes. The substance thus sinters until at about 150° C. it melts completely with a spontaneous rinse in temperature. The melt crystallizes upon cooling. When recrystallized from ethanol, 48 parts of 2,5-bis-[3,3-dimethyl-1-phenylureido] terephthalic acid dimethyl ester having the formula

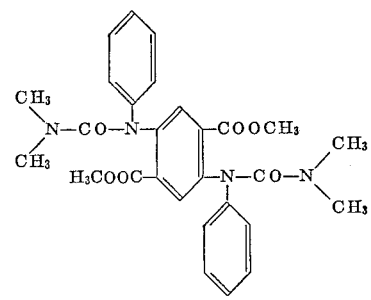

is obtained in the form of colorless crystals which melt at 141° C.

Analysis.—Found: C, 65.0%; H, 6.2%; O, 17.5%; N, 11.1%. Calculated: C, 64.8%; H, 5.8%; O, 18.5%; N, 10.8%.

The colorless diethyl ester having a melting point of 135° C. is obtained in an analogous way.

57 parts of 2,5-bis-[3,3-dimethyl-1-phenylureido]-terephthalic acid dimethyl ester is heated for 9 hours at 170° C. in 500 parts of o-dichlorobenzene to which 80 parts of p-toluenesulfonic acid has been added. The reaction mixture is cooled to 50° C. and 40 parts of methanol is added. The crystalline fraction is filtered off and washed with another 20 parts of methanol. Upon drying, 27 parts of cis-transquinacridone is obtained.

EXAMPLE 2

20 parts of the bis-N-phenyl-N',N'-dimethylisourea ether of dimethyl 2,5-dihydroxyterephthalate, such as is described in Example 1, is heated in 50 parts of dichlorobenzene for four hours at 120° C. After the whole has been cooled and allowed to stand for some time, 15 parts of 2,5-bis-[3,3-dimethyl-1-phenylureido]-terephthalic acid dimethyl ester crystallizes out from the solution. By adding petroleum ether, another 3 to 4 parts of the compound may be recovered from the mother liquor.

The following substituted 2,5-bis-[1-arylureido]-terephthalic acid dimethyl esters can be obtained in the manner described in Example 1 or 2:

(a) 2,5 - bis-[3,3-dimethyl-1-phenylureido]-terephthalic acid dimethyl ester, pale yellow crystals, melting point 198° C.;

(b) 2,5 - bis-[3,3-diphenyl-1-phenylureido]-terephthalic acid dimethyl ester, colorless crystals, melting point 325° C. (with decomposition);

(c) 2,5-bis-[3,3-diethyl-1-(p-chlorphenyl)-ureido]- terephthalic acid dimethyl ester, pale yellow crystals, melting point 212° C.;

(d) 2,5-bis-[3,3-di-n-butyl-1-(4-methylphenyl)-ureido]-terephthalic acid dimethyl ester, pale yellow crystals, melting point 195° C.

EXAMPLE 3

45.2 parts of dimethyl dihydroxyterephthalate is dissolved in 500 parts of o-dichlorobenzene at 100° C. and at this temperature 72 parts of 30% solution of sodium methylate in methanol is carefully dripped in so that the bulk of the methanol is distilled off. Then the whole is heated for another hour at 100° C. while leading a stream of dry nitrogen thereover so that the remaining methanol is removed from the reaction mixture. The resultant suspension of the crude disodium phenolate of dimethyl dihydroxyterephthalate has 106 parts of N-phenyl-N',N'-di-n-butyl-2-chloroformylamidine added thereto in portions at about 100° C. so that the temperature is kept at 100° C. without further supply of heat. The solution is kept at 100° C. until completely decolorized and then heated for one hour at 160° C., about 300 parts of o-dichlorobenzene being distilled off under subatmospheric pressure. The whole is cooled and allowed to stand for some time; pale yellow crystals crystallize out from the solution and the separation of the same is completed by adding petroleum ether. After suction filtration, the common salt formed by the reaction is removed by washing with water and the residue is dried. 125 parts of pale yellow dimethyl ester of 2,5-bis-[3,3-di-n-butyl-1-phenyl-ureido]-terephthalic acid having a melting point of 108° C. is obtained.

EXAMPLE 4

22.6 parts of dimethyl 4,6-dihydroxyisophthalate is suspended in 300 parts of benzene and then 36 parts of 30% solution of sodium methylate in methanol is added. The whole is stirred for one hour at 50° C. and then about 150 parts of solvent is distilled off with the excess of methanol. A solution of 37 parts of N-phenyl-N′,N′-dimethyl-2-chloroformylamidine in 100 parts of benzene is then added slowly at 50° C. The whole is stirred for another hour at 50° C. After the reaction mixture has been cooled, the sodium chloride formed is filtered off and the solution is concentrated under subatmospheric pressure at about 30° C. The residue is a colorless viscous oil consisting of the N-phenyl-N′,N′-dimethylisourea ether of the dimethyl ester of 4,6-hydroxyisophthalic acid.

*Analysis.*—Found: N, 11.3%. Calculated: N, 10.8%.

The following bis-isourea ethers of dimethyl 4,6-dihydroxyisophthalate may be obtained in the same way:

(a) Bis - N - phenylpiperidinoisourea ether, colorless viscous oil;

(b) Bis - N - phenyl-N′-methyl-N′-phenylisourea ether, colorless crystals, melting point 125° C;

(c) Bis - N - 3,5 - dichlorophenyl-N′,N′-diethylisourea ether, colorless crystals, melting point 118° C;

(d) Bis-N-4-methoxyphenyl-N′,N′-diethylisourea ether, colorless viscous oil;

(e) Bis-N-2-naphthyl-N′,N′-diethylisourea ether, colorless crystals, melting point 129° C.

50 parts of the bis - N - phenyl-N′,N′-dimethylisourea ether of dimethyl 4,6-dihydroxyisophthalate is heated in 100 parts of toluene for two hours at 100° C. After cooling, 40 parts of colorless crystals having a melting point of 158° C. crystallizes out. Another 8 parts of the diurea can be obtained by adding cyclohexane or by concentrating the mother liquor. The dimethyl ester of 4,6-bis-[3,3-dimethyl-1-phenyl-ureido]-isophthalic acid, which has the formula:

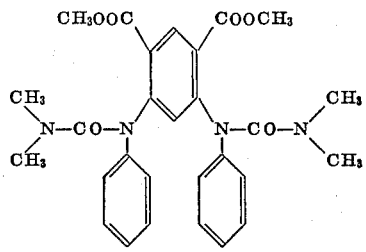

crystallizes with great difficulty. The solution is concentrated to about half its volume. The residue then crystallizes readily when rubbed with acetone.

*Analysis.*—Found: C, 64.5%; H, 6.1%; O, 19.1%; N, 10.6%. Calculated: C, 64.8%; H, 5.8%; O, 18.5%; N, 10.8%.

Rearrangement may also be carried out in dichlorobenzene at 150° C.; the reaction period is thereby shortened to a few minutes.

The following substituted 4,6-bis-[1-arylureido]-isophthalic acid dimethyl esters can be obtained in the same way:

(a) 4,6 - bis - [N-phenyl-1-piperidinocarboxamido]-isophthalic acid dimethyl ester, colorless viscous oil;

(b) 4,6 - bis - [3 - methyl-3-phenyl-1-phenylureido]-isophthalic acid dimethyl ester, colorless crystals, melting point 240° C. (with decomposition);

(c) 4,6 - bis-[3,3-diethyl-1(3,5-dichlorphenyl)-ureido]-isophthalic acid dimethyl ester, colorless crystals, melting point 211° C.;

(d) 4,6 - bis-[3,3-diethyl-1(4-methoxyphenyl)-ureido]-isophthalic acid dimethyl ester, colorless crystals, melting point 135° C.;

(e) 4,6 - bis - [3,3 - diethyl-1-(naphthyl-2)-ureido]-isophthalic acid dimethyl ester, colorless crystals, melting point 227° C.

I claim:

1. A bis-[1-arylureido]-benzene-p- or m-dicarboxylic acid dialkyl ester whose arylamino groups are in ortho-position to the carbalkoxy groups and in which the arylamino groups are members selected from the group consisting of phenyl, naphthyl, 9-methylcarbazyl, phenyl substituted by 1 to 2 chlorine atoms, phenyl substituted by 1 to 2 bromine atoms, phenyl substituted by 1 to 2 alkyl groups having 1 to 4 carbon atoms, and phenyl substituted by 1 to 2 alkoxy groups having 1 to 4 carbon atoms, the carbamoyl groups having the formula

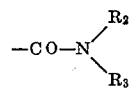

wherein $R_2$ and $R_3$ each denotes a member selected from the group consisting of alkyl having 1 to 4 carbon atoms, phenyl, and naphthyl, and $R_2$ and $R_3$, when taken together with the nitrogen atom to which they are attached, form a piperidine, pyrrolidine or hexamethyleneimine ring, and the alkyl groups of the ester group have 1 to 4 carbon atoms.

2. The dimethyl ester of 2,5-bis-[3,3-dimethyl-1-phenyl-ureido]-terephthalic acid.

3. The dimethyl ester of 2,5-bis-[3,3-diphenyl-1-phenyl-ureido]-teraphthalic acid.

4. The dimethyl ester of 2,5-bis-[3,3-diethyl-1-(p-chlorphenyl)-ureido]-teraphthalic acid.

5. The dimethyl ester of 4,6-bis-[N-phenyl-1-piperidinocarboxamido]-isophthalic acid.

6. The dimethyl ester of 4,6-bis-[3,3-diethyl-1-(naphthyl-2)-ureido]-acid.

References Cited

UNITED STATES PATENTS

| | | | |
|---|---|---|---|
| 2,993,791 | 7/1961 | Coles et al. | 260—471 |
| 3,045,040 | 7/1962 | Deuschel | 260—471 |
| 3,109,022 | 10/1963 | Scherrer | 260—471 |
| 3,124,581 | 3/1964 | Boher | 260—471 |

OTHER REFERENCES

Bogert et al. J. Am. Chem. Soc., vol. 29, pages 729–733 (1907).

Bogert et al., J. Am. Chem. Soc., vol. 31, pages 841–848 (1909).

JOHN D. RANDOLPH, *Primary Examiner.*

E. D. LEWIS, *Assistant Examiner.*

U.S. Cl. X.R.

167—30, 32, 33; 260—239, 279, 326.3, 471, 553